Figure 1:
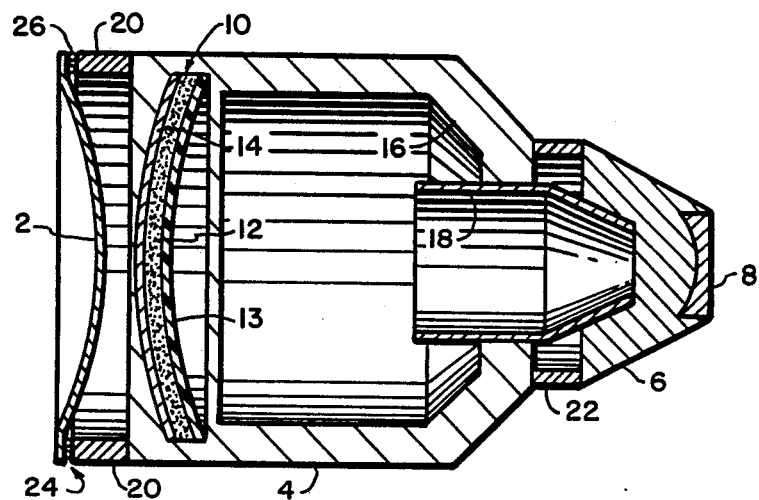

United States Patent [19]

van Esdonk et al.

[11] Patent Number: 4,749,119
[45] Date of Patent: Jun. 7, 1988

[54] VACUUM-TIGHT THERMOCOMPRESSION SEAL INVOLVING THE FORMATION OF AN OXIDE SKIN

[75] Inventors: Johannes van Esdonk; Johannes T. Klomp, both of Eindhoven, Netherlands; Michael D. Martin, Crawley Down, Great Britain

[73] Assignee: U.S. Philips Corp., New York, N.Y.

[21] Appl. No.: 854,257

[22] Filed: Apr. 21, 1986

[30] Foreign Application Priority Data

Apr. 24, 1985 [NL] Netherlands ..................... 8501180

[51] Int. Cl.⁴ .............................................. H01J 9/26
[52] U.S. Cl. ...................................... 228/116; 445/44; 228/203
[58] Field of Search ................... 228/116, 203, 232; 445/44

[56] References Cited

U.S. PATENT DOCUMENTS 4,398,980 8/1983 Kelsey, Jr. et al. ............ 228/232 X

FOREIGN PATENT DOCUMENTS 47710 10/1977 U.S.S.R. ........................... 228/116

Primary Examiner—Kenneth J. Ramsey
Attorney, Agent, or Firm—Norman N. Spain

[57] ABSTRACT

For thermocompression sealing at least one of the materials to be joined is provided with an oxide skin before or during the sealing operation. The oxide skin can be formed, for example by firing in air. It has been found that the method is particularly advantageous for seals between a CrNi-alloy and, for example a second element which consists of aluminium, for example the seal between an Al entrance window and a CrNi-steel envelope of an X-ray intensifier tube. Notably by addition of an intermediate material, in particular aluminium, seals can thus be realized between many materials.

11 Claims, 1 Drawing Sheet

VACUUM-TIGHT THERMOCOMPRESSION SEAL INVOLVING THE FORMATION OF AN OXIDE SKIN

The invention relates to a method of forming a vacuum-tight thermocompression seal between a first material and a second material, one of the materials being provided with a cover layer in order to prevent the formation of disturbing intermetallic compounds at the area of the seal, and also relates to vacuum-tight envelopes including such a seal.

In known thermocompression seals, for example, between a chromium-nickel steel alloy, and another material the cover layer is provided by electrodeposition of a layer of Ni on the CrNi steel alloy at the area of the seal. The thermocompression seal is subsequently formed with the intermediate nickel layer thus deposited.

The deposition of the nickel layer is a comparatively cumbersome, additional operation which requires an additional device, such as used in the case of electroplating.

It is the object of the invention to mitigate this drawback; to achieve this, the method described above in accordance with the invention is characterized in that the cover layer is formed by oxidation of a relevant surface area of at least one of the materials to be joined, after which the thermocompression seal is formed.

Because the method in accordance with the invention requires only oxidation in preparation of the formation of the actual seal, the seal can be realized more quickly and by means of a minimum number of additional devices.

In a preferred version, the oxidation is realized by way of a firing process, for example, in air. This method is very suitable for the formation of a thermocompression seal between, for example a chromium alloy such as CrNi-steel and notably aluminium as the second material. A seal of this kind is used, for example in X-ray image intensifier tubes which include an aluminium entrance window and a further envelope which is made of CrNi-steel. A relevant part of the basic body which is made of CrNi-steel is then fired in air at a temperature of approximately 550° C. for approximately 30 minutes.

A further advantage of the method in accordance with the invention consists in that the thermocompression seal between the oxide skin and the second material can be realized within a comparatively short period of time, for example within 10 seconds.

The formation of intermetallic compounds which could adversely affect the seal is thus prevented, again.

In a further preferred version, such a seal is realized with the addition of a further material which acts as an intermediary for sealing to the second material which may be, for example, glass, ceramic, titanium etc.

Figure 2:
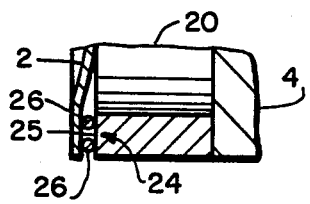

Some preferred embodiments in accordance with the invention will be described in detail hereinafter with reference to the drawings of which:

FIG. 1 shows an X-ray image intensifier tube, parts of the envelope of which have been joined using thermocompression seals in accordance with the invention; and FIG. 2 is an enlarged section of FIG. 1 showing one embodiment of the thermocompression seal.

An X-ray image intensifier tube as shown includes an entrance window 2, for example of Al or Ti, a cylindrical envelope portion 4, a conical envelope portion 6, an exit window 8, an entrance screen 10 having a luminescent layer 12 with a photocathode 13 provided on a carrier 14, a first anode 16 and a second anode 18.

In the present embodiment the entrance window 2 as well as the first envelope portion 4 is connected to a first supporting ring 20, the first envelope portion being connected on the other side to a second supporting ring 22 whereto the second envelope portion 6 is also connected. The envelope portions and the supporting rings are made of, for example a CrNi-steel alloy. The formation of the seal between the first envelope portion and the second envelope portion as well as between the second envelope portion and the second supporting ring and of the seal between the first envelope portion and the first supporting ring is not problematic when the portions to be connected may consist of the same material.

The sealing between the entrance window and the first supporting ring, howver, involves different materials and the method in accordance with the invention can be used notably for such seals. For example, an annular surface area 24 of the supporting ring is then oxidized and a thermocompression connection to the entrance window is realized via an intermediate oxide layer 25 thus formed. For example, when an aluminium entrance window is used, the thermocompression connection can be directly made, if desired. When other materials are used for the entrance window, for example glassy carbon, titanium etc., it is advantageous to use an intermediate layer of aluminium which is inserted after the oxidation, for example in the form of one or more aluminium wires 26 having a diameter of, for example 2.5 mm., prior to the actual thermocompression process. It has been found that oxidation often does not require a separate operation because adequate oxidation occurs already during the thermocompression process when the latter is performed in air or when an adequate amount of oxygen is added in a conditioned manner.

Although the invention has been described notably with reference to an X-ray image intensifier tube, the invention is by no means restricted thereto; it can also be used for, for example vacuum switches, lasers, cathode ray tubes etc. Notably the introduction of the intermediate material increases the choice of materials to be joined and because the actual connection can be realized within a short period of time, the risk of one of the parts being affected is small in comparison with known connection techniques.

What is claimed is:

1. A method of forming a vacuum-tight thermocompression seal between a first material and a second material selected from the group consisting of aluminum and titanium, one of said materials being provided with a cover layer in order to prevent the formation of disturbing intermetallic compounds at the area of the seal, comprising forming said cover layer by oxidizing a relevant surface area of at least one of the materials to be joined and then forming the thermocompression seal.

2. The method of claim 1 wherein the second material is aluminum.

3. A method of forming a vacuum-tight thermocompression seal between a first material and a second material selected from the group consisting of aluminum and titanium, one of said materials being provided with a cover layer in order to prevent the formation of disturbing intermetallic compounds at the area of the seal, comprising forming said cover layer by oxidizing a relevant surface area of at least one of the materials to be joined, inserting an intermediate material, other than said two materials to be joined, between said two materials, and then forming the compression seal.

4. The method of claim 3 wherein the second material is aluminum.

5. The method of claim 3 wherein aluminum is the intermediate material.

6. The method of claim 5 wherein the second material is titanium.

7. A method as claimed in claim 5, characterized in that the first material to be joined is a chromium alloy, a relevant part thereof being fired in air at a temperature of approximately 550° C. for approximately 30 minutes in order to achieve oxidation.

8. A method as claimed in claim 7, characterized in that the chromium alloy is CrNi-steel.

9. A vacuum-tight envelope characterized in that it includes a thermocompression seal formed by the method of claim 5.

10. An X-ray image intensifier tube, characterized in that a radiation entrance window thereof is connected to an envelope portion of the tube by means of a thermocompression seal formed by the method of claim 5.

11. A cathode ray tube which includes a viewing screen and an envelope portion which together form a vacuum-tight housing, characterized in that the viewing screen is connected to the envelope portion by means of a thermocompression seal formed by the method of claim 5.

* * * * *